United States Patent [19]

Das et al.

[11] Patent Number: 5,264,288
[45] Date of Patent: Nov. 23, 1993

[54] ELECTROLESS PROCESS USING SILYLATED POLYAMINE-NOBLE METAL COMPLEXES

[75] Inventors: Balbhadra Das, Allison Park; Robert G. Swisher, Pittsburgh, both of Pa.

[73] Assignee: PPG Industries, Inc., Pittsburgh, Pa.

[21] Appl. No.: 955,084

[22] Filed: Oct. 1, 1992

[51] Int. Cl.$^5$ ............................................. C23C 26/00
[52] U.S. Cl. ...................................... 428/434; 427/305; 427/306; 427/437; 427/443.1; 428/433
[58] Field of Search ................... 427/437, 443.1, 305, 427/306; 428/434, 433

[56] References Cited

U.S. PATENT DOCUMENTS

| | | | |
|---|---|---|---|
| 2,915,406 | 12/1959 | Rhoda et al. | 106/1 |
| 3,011,920 | 12/1961 | Shipley, Jr. | 117/213 |
| 3,105,772 | 10/1963 | Loiseleur | 117/35 |
| 3,235,392 | 2/1966 | Miles | 106/1 |
| 3,285,754 | 11/1966 | Hopkin | 106/1 |
| 3,338,726 | 8/1967 | Berzins | 106/1 |
| 3,398,168 | 8/1968 | Medema | 260/429 |
| 3,556,955 | 1/1971 | Ancker et al. | 204/30 |
| 3,584,020 | 6/1971 | Bach | 260/429 |
| 3,622,367 | 11/1971 | Haag | 117/37 R |
| 3,635,761 | 1/1972 | Haag et al. | 117/227 |
| 3,802,907 | 4/1974 | Apfelbach et al. | 117/54 |
| 3,876,675 | 4/1975 | Trofimenko | 260/429 J |
| 3,883,570 | 5/1975 | Trofimenko | 260/429 R |
| 3,978,252 | 8/1976 | Lombardo et al. | 427/299 |
| 3,993,807 | 11/1976 | Stabenow et al. | 427/229 |
| 4,006,047 | 2/1977 | Brummett et al. | 156/656 |
| 4,065,479 | 12/1977 | Larock | 260/429 L |
| 4,098,807 | 7/1978 | Stone et al. | 260/429 CY |
| 4,152,165 | 5/1979 | Langager | 106/2 |
| 4,180,600 | 12/1979 | Feldstein | 427/97 |
| 4,230,788 | 10/1980 | Spiertz et al. | 430/153 |
| 4,244,739 | 1/1981 | Cagnassi | 106/1.11 |
| 4,248,632 | 2/1981 | Ehrich et al. | 106/1.11 |
| 4,255,194 | 3/1981 | Hough et al. | 106/1.24 |
| 4,279,951 | 7/1981 | Hough et al. | 427/437 |
| 4,297,397 | 10/1981 | Feldstein | 427/304 |
| 4,344,998 | 8/1982 | de Leeuw et al. | 428/212 |
| 4,368,221 | 1/1983 | Stefan et al. | 427/305 |
| 4,410,569 | 10/1983 | Siedle | 427/304 |
| 4,424,241 | 1/1984 | Abys | 427/443.1 |
| 4,424,352 | 1/1984 | Siedle | 544/4 |
| 4,500,569 | 2/1985 | Siedle | 427/304 |
| 4,555,414 | 11/1985 | Hoover et al. | 427/43.1 |
| 4,560,445 | 12/1985 | Hoover et al. | 204/15 |
| 4,568,571 | 2/1986 | Sirinyan et al. | 427/306 |
| 4,592,932 | 6/1986 | Biswas et al. | 427/163 |
| 5,002,831 | 3/1991 | Plueddemann | 428/447 |

OTHER PUBLICATIONS

"Autocatalytic Deposition of Nickel" by J. K. Dennis & T. E. Such in *Nickel and Chromium Plating*, 2nd ed., 1986, Chapter 11, pp. 269–285, Library of Congress #85-13269.

"Electroplating onto Plastics" by J. K. Dennis & T. E. Such in *Nickel and Chromium Plating*, 2nd ed., 1986, Chapter 12, pp. 286–314, Library of Congress #85-13269.

*Primary Examiner*—Shrive Beck
*Assistant Examiner*—Vi Duong Dang
*Attorney, Agent, or Firm*—James B. Robinson; Kenneth J. Stachel

[57] ABSTRACT

A process for coating a non-conductive substrate, such as glass, ceramic or plastic, which comprises applying to the surface of the substrate a coating of a silylated polyamine-noble metal (SPNM) complex and then optionally bringing the coated substrate so obtained into contact with a solution containing a metal salt, such as a salt of nickel, cobalt or copper, to obtain plating of metal from the latter solution onto the surface of the substrate.

21 Claims, No Drawings

ELECTROLESS PROCESS USING SILYLATED POLYAMINE-NOBLE METAL COMPLEXES

BACKGROUND OF THE INVENTION

This invention relates to an electroless process for coating a non-conductive substrate with a silylated polyamine-noble metal (SPNM) complex and then optionally plating the coated substrate with a metal from a metal salt solution.

Electroless plating processes for the application of a conductive metal onto the surface of a non-catalytic substrate are known. By "electroless plating process", we mean plating processes which do not use electric current. An example is a chemical plating process in which a non-conductive substrate is plated from an aqueous solution having dissolved therein a metal salt corresponding to the metal to be deposited upon such substrate. One such process, described in U.S. Pat. No. 3,338,726 to Berzins, involves first applying a coating of stannous chloride to the substrate to sensitize it. The substrate so sensitized is then coated with a thin film of palladium chloride which will serve as a catalyst to promote the reduction of metal from an aqueous solution.

We have found that an effective electroless metal plating process can be carried out by a two stage process. The first stage involves applying a thin coating of an SPNM complex to a non-conductive substrate and the second stage is bringing the coated substrate into contact with a solution containing a metal salt whereby metal from the metal salt is deposited onto the surface of the substrate.

SUMMARY OF THE INVENTION

The substrates which can be used include any substrate having a non-conductive surface, for example, glass, ceramics and organic plastics such as nylon, including fibers, flakes and beads formed therefrom, and mineral fillers including silica, calcium, carbonate, alumina and titanium dioxide. The invention is particularly adapted to coat and/or plate substrates in fiber forming, e.g. glass fibers.

A silylated polyamine-noble metal (SPNM) complex is used to form the initial coating or film on the substrate. By "silylated polyamine-noble metal complex" we mean complexes in which a noble metal is complexed with two to six, preferably two, amine nitrogens and wherein at least one of the nitrogens is linked to alkoxy silane or hydroxy silane. Preferred examples of such SPNM complexes are defined in our concurrently filed and commonly assigned application Ser. No. 07/955,093 entitled "Silylated Polyamine-Noble Metal Complexes". Thus, the preferred SPNM complexes are selected from the group consisting of the following structural formulas:

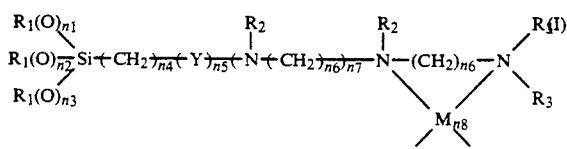

and,

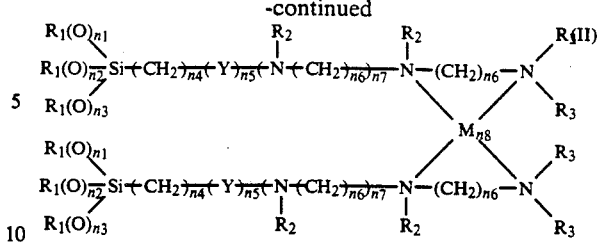

wherein $R_1$ is selected from the group consisting of H; alkyls having from 1 to 6 carbon atoms, preferably 1 to 2 carbon atoms; a glycol radical;

$R_4(OR_5)_{n9}$, $R_4$ being selected from the group consisting of H, alkyls having from 1 to 6 carbon atoms, preferably from 1 to 2 carbon atoms;

$R_5$ is an alkylene having from 1 to 4 carbon atoms, preferably 2 carbon atoms and $n_9$ is an integer ranging from 0 to 9, preferably 1;

$n_1$, $n_2$ and $n_3$ are either 0 or 1, provided $n_1+n_2+n_3$ totals 1 to 3, preferably 3;

$n_4$ is an integer ranging from 2 to 5, preferably 3;

$n_5$ is either 0 or 1, preferably 0;

Y is a divalent moiety, such as

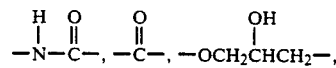

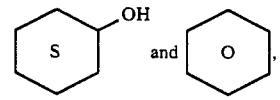

preferably 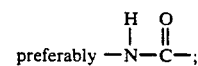

$R_2$ is selected from the group consisting of H and alkyls having either 1 or 2 carbon atoms, preferably 1, but most preferably H;

$n_6$ is either 2 or 3, preferably 2;

$n_7$ is either 0 or 1, preferably 0;

$n_8$, the ionic charge on the complex, is from 0 to 3, preferably 0;

$R_3$ is selected from the group consisting of H and alkyls having from 1 to 3 carbon atoms, preferably 1, but most preferably H;

M is selected from the group of noble metals consisting of Pd, Pt, Ru and Rh, preferably Pd; and $X_1$ and $X_2$ are selected from the group consisting of the halogens, preferably chlorine, OH, $N(R_6)_3$, wherein $R_6$ is selected from the group consisting of H, alkyls having from 1 to 3 carbon atoms and $(R_7)_2N-(CH_2)_{n10}-N(R_7)_2$, wherein $R_7$ is selected from the group consisting of H, alkyls having from 1 to 3 carbon atoms and $n_{10}$ is either 2 or 3, preferably 2.

In preparing the novel SPNM complexes, we can use as reactants silanes defined by the following structural formula:

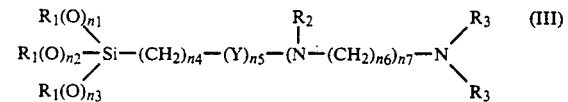

wherein $R_1$, $R_2$, $R_3$, $n_1$, $n_2$, $n_3$, $n_4$, $n_5$, $n_6$, $n_7$ and Y are as defined above, and noble metal salts defined by one of the following structural formulas:

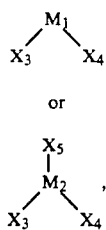

wherein $M_1$ is selected from the group consisting of Pd and Pt, preferably Pd; $M_2$ is selected from the group consisting of Ru and Rh; $X_3$, $X_4$ and $X_5$ can be, for example, halogens, such as chlorine or bromine, OH, acetate, sulfate or nitrate. In lieu of noble metal salts defined above, derivatives thereof, such as diamaminedichloropalladium, potassium tetrachloroplatinate or hexaamine ruthenium chloride can also be used.

Specific examples of silanes that can be employed herein to react with the noble metal salts to obtain the novel SPNM complexes include gamma-aminoethylaminopropyltrimethoxysilane, available from Union Carbide Corporation under the trade name A-1120, trimethoxysilylpropyldiethylenetriamine, available from Union Carbide Corporation under the trade name A-1130, (aminoethylaminomethyl) phenethyltrimethoxysilane, available from Hüls America, Inc. under the trade name A0698, and N-(2-aminoethyl)-3-aminopropylmethyldimethoxysilane, available from Hüls America, Inc. under the tradename CA0699. Specific examples of noble metal salts that can be reacted with the above silanes include palladium chloride, palladium nitrate, palladium sulfate, platinum chloride, ruthenium chloride, rhodium chloride, rhodium nitrate and rhodium sulfate.

The molar ratios of the silane (III) to the noble metal salt (IV) needed to prepare SPNM complexes (I) and (II) can range from about 2.5:1 to about 1:1.5, preferably from about 2:1 to about 1:1, most preferably about 1:1. If the silane (III) is present in excess of noble metal salt (IV) the tendency is to make the SPNM complex (II), but if the two are present in approximately equal molar amounts, the tendency is to prepare the SPNM complex (I), the preferred SPNM complex.

The SPNM complexes (I) and (II) can be prepared, for example, by separately dissolving the silane (III) and the noble metal salt (IV) in suitable solvents, such as water or an alcohol, for example, methanol or ethanol, to form dilute solutions thereof, for example, solutions containing from about two to about 10 weight percent each of the silane (III) and the noble metal salt (IV). The two solutions are then mixed and stirred, for example, for about one to two hours, at ambient temperature, for example, about 22° C. (72° F.), resulting in the production of either SPNM complex (I) or (II), depending on the amounts of silane (III) and noble metal salt (III) used. When the solvent used is an alcohol, recovery of the SPNM complex (I) or (II) so produced can be effected by means such as rotary evaporation under substantially anhydrous conditions. When the solvent is water, it is preferred to maintain the SPNM complex (I) or (II) in the aqueous phase until its utilization is required to inhibit self polymerization of the noble metal complexes (I) or (II).

In the first stage, the non-conductive substrate is brought into contact with an aqueous solution having dissolved therein one or more of the SPNM complexes to deposit on the substrate a thin film of the SPNM complex. The aqueous solution can contain from about 0.002 to about 2 weight percent of the SPNM complex, preferably 0.1 to 1.

The first stage solution may also contain an amount by weight approximately equal to the SPNM complex of a sulfonato-organosilanol compound which acts to increase the rate of metal deposition. Such compounds are described in U.S. Pat. Nos. 4,152,165 and 4,235,638. An example of such a compound is:

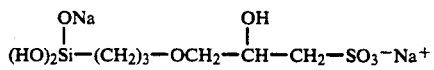

If desired, when the non-conductive substrate is formed of fibers like glass fibers, the aqueous solution can contain a small amount, for example from about 0.01 to about 0.03 weight percent, of a lubricant to reduce fiber abrasion. One such lubricant is a polyamine-polyamide type such as EMERY ® 6717 available from Henkel Corporation.

The temperature of the aqueous solution can be, for example, in the range of about 25° C. (77° F.) to about 85° C. (185° F.), and the pressure can be ambient. The time of contact can be from just seconds to a minute or more.

After deposition of the SPNM complex on the substrate surface, caution should be exercised to prevent introduction of excess water-soluble SPNM complex into the subsequent metal plating bath. This can be done, for example, by passing the treated substrate at the end of the first stage through a water bath to remove excess SPNM complex by dissolving it in the water. Alternatively, the treated substrate at the end of the first stage can be heated at an elevated temperature, for example, about 60° C. (140° F.) to about 150° C. (302° F.), for about 20 minutes to about 24 hours, or even longer, to bond all of the SPNM complex to the substrate.

After the first stage, the coated substrate may be plated with metal utilizing the second stage as described below, or may be heat treated and used for other purposes, e.g. as catalysts or intermediates. Heat treating involves heating the SPNM coated substrate at a temperature and for a time sufficient to remove organic materials, a typical temperature to accomplish this being about 700° C. (1292° F.). The time needed at this temperature is short, on the order of seconds, though it can be longer, if, for instance, lower temperatures are employed.

When the second stage is to be carried out, the substrate carrying the SPNM complex on its surface need not be heat treated unless it is desired to do so. The SPNM coated substrated is passed into contact with an aqueous solution containing the metal salt of the metal that is to be deposited on the substrate surface. This salt may be, for example, nickel, cobalt or copper sulfates or chlorides in an amount of about 1 to about 20 weight percent of the solution, generally from 2 to 10.

A suitable buffering or complexing agent can also be present in the second stage solution to help control the rate of deposition of metal on the substrate surface and to help maintain the metal salt in solution. This agent may be present in an amount of from about 0.5 to about 15 weight percent of the solution, preferably from 1 to 10. Examples of such agents are sodium acetate, ethylenediamine, sodium citrate, ammonium chloride or sodium succinate.

Also present in the second stage solution is a reducing agent, such as dimethylamine borane or sodium hypophosphite in an amount corresponding to 0.2 to about 5 weight percent of the solution, generally from 0.5 to 3.

The temperature of the second stage can be in the range of about 25° C. (77° F.) to about 95° C. (203° F.) and the pressure is preferably ambient. Contact time can be in the range of a few seconds up to about 20 minutes or more.

After passing through the aqueous second stage solution, it is usually preferred to wash the substrate in water to remove from its surface any extraneous materials deposited thereon as these might adversely affect the desired function of the metal coating. Alternatively, the substrate may be passed through a steam chamber at approximately ambient pressure for a few seconds.

The process defined above can be carried out continuously or can be carried out in stages as desired.

DETAILED DESCRIPTION

EXAMPLE 1

A first solution was prepared by adding 3900 grams of hot (about 80° C. or 176° F.) deionized water to 47 grams of concentrated hydrochloric acid. The solution was stirred for about five minutes, after which 83 grams of $PdCl_2$ was added thereto and stirring was continued, while maintaining the resulting solution at the temperature in the range of about 60° C. (140° F.) to 70° C. (158° F.), until the $PdCl_2$ was totally dissolved in the water. The hydrochloric acid was used to aid the $PdCl_2$ to go into solution.

A second solution was prepared by adding 3900 milliliters of deionized water at ambient conditions to 106 grams of the amino silane $(CH_3O)_3$-$Si(CH_2)_3NH(CH_2)_2NH_2$ and then stirring for 20 minutes.

A third solution was prepared by adding 1960 grams of deionized water at ambient conditions to 95 grams of concentrated ammonia sufficient to adjust the pH in the range of about 7 to 8.

The second solution was slowly poured into the stirred first solution. A yellow dispersion was noted in the contents of the container. Stirring was continued and 2000 milliliters of the third solution was then slowly added, after which stirring was further continued for an additional 20 minutes. An additional 1000 milliliters of the third solution was added and stirring was continued for 20 minutes. Finally, the remainder of the third solution was added and stirring was continued for still another 20 minutes until the yellow dispersion was dissolved in the solution. The product obtained was analyzed by infrared spectroscopy and the spectral data obtained was consistent with the SPNM complex defined by the following structural formula:

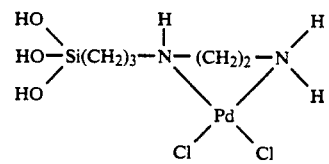

The solution produced above is that described in Example 1 of our concurrently filed application "Silylated Polyamine-Noble Metal Complexes" referred to above. The solution was diluted to a concentration of one weight percent with distilled water. Fiber glass fabric was immersed in the solution and then removed after 15 minutes. Excess moisture was removed from the fabric by blotting with a paper towel, after which the fabric was allowed to air dry and further dried in an oven at 130° C. (266° F.) for 20 minutes.

A nickel plating solution was prepared by adding 3.5 grams of nickel sulfate and 2.1 grams of sodium acetate to 140 grams of distilled water at 35° C. (95° F.) with stirring. To this solution there was then added 0.56 gram of dimethylamine borane with stirring until it was completely dissolved. The temperature was maintained at 35° C. (95° F.) for the subsequent coating process. The treated fiber glass fabric was immersed in the plating solution for 5 minutes with mild agitation. During this time the fabric became metallic in appearance.

The nickel-coated fabric was removed from the plating solution and immersed in distilled water with mild agitation for 1 minute, after which it was removed, blotted dry and allowed to dry in air.

Conductivity measurements indicated the glass fabric had a resistance of 16 ohms/square, whereas the resistance of the initial fabric was greater than $10^6$ ohms/square.

EXAMPLE 2

A solution was prepared by adding 2.0 grams of palladium chloride and 1.3 grams of sodium chloride to 100 grams of methanol. The resulting mixture was refluxed with stirring for 20 minutes. Then 2.5 grams of A-1120 in 25 grams of methanol were added dropwise to the refluxing solution. The dark brown color initially obtained became cloudy yellow with continued refluxing. After one-half hour the mixture was cooled to room temperature, filtered and then concentrated by rotary evaporation, resulting in precipitation of product from solution.

The product obtained was analyzed by infrared spectroscopy and the spectral data obtained was consistent with the SPNM complex defined by the following structural formula:

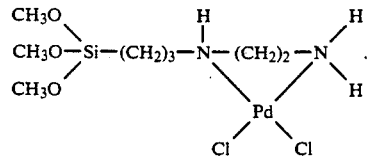

The solution produced above is that described in Example 2 of our concurrently filed application "Silylated Polyamine-Noble Metal Complexes". The above solution was used in the procedure of Example 1 above. The conductivity results obtained were similar to that obtained in Example 1.

EXAMPLE 3

A first solution was prepared by dissolving 1.03 grams of diethylenetriamine in 125 grams of anhydrous ethanol. A second solution was prepared containing 2.47 grams of 3-isocyanatopropyltriethoxysilane and 50 grams of anhydrous ethanol. The second solution was added dropwise to the first solution at 50° C. (122° F.) with stirring. Stirring was continued for two additional hours, after which infrared spectroscopy indicated a complete reaction between the silane and the diethylenetriamine. Next, 0.88 gram of palladium chloride and 0.56 gram of sodium chloride were dissolved in 50 grams of ethanol by refluxing. This solution was added to the previous solution and then refluxed with stirring for two hours. The resulting mixture was filtered, then concentrated by rotary evaporation until the product precipitated.

The product obtained was analyzed by infrared spectroscopy and the spectral data obtained was consistent with the silylated polyamine nobel metal complex defined by the following formula:

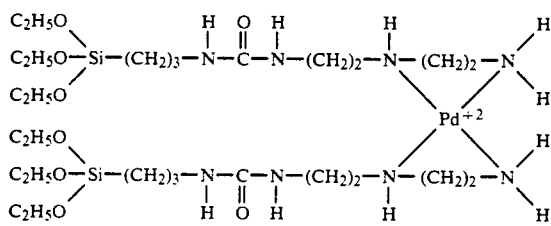

The solution produced above is that described in Example 3 of our concurrently filed application "Silylated Polyamine-Noble Metal Complexes". The above solution was used in the procedure of Example 1 above. The conductivity results obtained were similar to that obtained in Example 1.

Example 1 was repeated a number of times as Examples 4 through 7, except that in place of the solution produced in Example 1, solutions produced in accordance with Examples 4, 5, 6 and 7 of our concurrently filed application "Silylated Polyamine-Noble Metal Complexes" were used. The conductivity results obtained in each instance were similar to those obtained in Example 1.

Comparative examples A and B show that the SPNM complex is critical in the claimed process.

COMPARATIVE EXAMPLE A

A solution of 85 grams of distilled water and 2.0 grams of concentrated hydrochloric acid was prepared. To this, 1.77 grams of palladium chloride was added with stirring. The mixture was heated to 80° C. (176° F.) until the palladium chloride was completely dissolved. The resulting dark brown solution was cooled to room temperature.

A second solution was prepared by dissolving 12.5 grams of the polyamine-polyamide (Emery® 6717) in 12.5 grams of methanol. This solution was then added to 625 grams of deionized water and stirred until completely dissolved.

The first solution was then added slowly to the second solution with stirring resulting in a clear yellow solution of the product. The final solution was stirred for 2 hours before using.

Example 1 was then repeated, except that in place of the solution used therein the above solution was used. A conductive coating was not formed under these conditions.

COMPARATIVE EXAMPLE B

A solution of 85 grams of distilled water and 2.0 grams of concentrated hydrochloric acid was prepared. To this, 1.77 grams of palladium chloride was added with stirring. The mixture was heated to 80° C. (176° F.) until the palladium chloride was completely dissolved. The resulting dark brown solution was cooled to room temperature.

A second solution was prepared by dissolving 12.5 grams of the polyamine-dimer acid condensation product (Versamid 140) in 12.5 grams of methanol. This solution was then added to 625 grams of deionized water and stirred with heating to 50° C. (122° F.) until dispersed.

The first solution was then added slowly to the second solution with stirring, resulting in a cloudy light yellow dispersion of the product. The final light yellow clear solution was obtained by adding one gram of concentrated hydrochloric acid and then stirring at 50° C. (122° F.) for two hours.

Example 1 was then repeated, except that in place of the solution used therein the above solution was used. A conductive coating was not formed under these conditions.

We claim:

1. A process for coating a non-conductive substrate which comprises applying to the surface of said substrate a coating of a silylated polyamine-noble metal (SPNM) complex.

2. The process of claim 1 further comprising, subsequent to applying said coating to said substrate, heating said substrate at a temperature and for a time sufficient to remove organic materials from said substrate.

3. The process of claim 2 wherein said temperature is approximately 700° C. (1292° F.).

4. A process for plating a non-conductive substrate with a metal which comprises applying to the surface of said substrate a coating of a first metal which is a silylated polyamine-noble metal (SPNM) complex, and then bringing said coated substrate into contact with a solution having dissolved therein a salt of a second metal to obtain plating of said second metal on the surface of said substrate.

5. The process of claim 4 further comprising the step of exposing said substrate to steam after bringing said coated substrate into contact with said solution having said metal salt.

6. The process of claim 1 wherein said substrate is selected from the group consisting of glass, mineral fillers, ceramics, and plastics.

7. The process of claim 6 wherein said substrate is in a form selected from the group consisting of fibers, flakes and beads.

8. The process of claim 1 wherein said noble metal is selected from the group consisting of palladium, platinum, ruthenium and rhodium.

9. The process of claim 4 wherein said metal salt is selected from the group consisting of nickel salts, cobalt salts, and copper salts.

10. The process of claim 4 wherein said metal salt is selected from the group consisting of nickel sulfate, nickel chloride, cobalt sulfate, cobalt chloride, copper sulfate and copper chloride.

11. The process of claim 1 wherein said SPNM complex is characterized by a noble metal complexed with from two to six amine nitrogens and at least one of said nitrogens is linked to an alkoxy silane.

12. The process of claim 11 wherein said noble metal is complexed with two amine nitrogens.

13. The process of claim 1 wherein said coating further comprises a sulfonato-organosilanol compound.

14. The process of claim 1 wherein said SPNM complex is selected from the group consisting of metal complexes defined by the following structural formulas:

$$R_1(O)_{n2}(R_1(O)_{n1})(R_1(O)_{n3})Si(CH_2)_{n4}(Y)_{n5}(N(CH_2)_{n6})_{n7}-N(R_2)-(CH_2)_{n6}-N(R_3)(R_3)M_{n8}X_1X_2$$

and, $$[R_1(O)_{n2}(R_1(O)_{n1})(R_1(O)_{n3})Si(CH_2)_{n4}(Y)_{n5}(N(R_2)(CH_2)_{n6})_{n7}-N(R_2)-(CH_2)_{n6}-N(R_3)_2]_2 M_{n8}$$

wherein $R_1$ is selected from the group consisting of H; alkyls having from 1 to 6 carbon atoms; a glycol radical; $R_4(OR_5)_{n9}$, $R_4$ being selected from the group consisting of H, alkyls having from 1 to 6 carbon atoms, and $R_5$ is an alkylene having from 1 to 4 carbon atoms, and $n_9$ is an integer ranging from 0 to 9;

$n_1$, $n_2$ and $n_3$ are either 0 or 1, provided $n_1+n_2+n_3$ totals 1 to 3;

$n_4$ is an integer ranging from 2 to 5;

Y is a divalent moiety selected from the group consisting of:

$$-N(H)-C(=O)-,\ -C(=O)-,\ -OCH_2CH(OH)CH_2-,$$

cyclohexanol (S) and phenol (O);

$n_5$ is either 0 or 1;

$R_2$ is selected from the group consisting of H and alkyls having either 1 or 2 carbon atoms;

$n_6$ is either 2 or 3;

$n_7$ is either 0 or 1;

$n_8$, the ionic charge on the complex, is an integer ranging from 0 to 3;

$R_3$ is selected from the group consisting of H and alkyls having from 1 to 3 carbon atoms;

M is selected from the noble metals Pd, Pt, Ru and Rh;

$X_1$ and $X_2$ are selected from the group consisting of the halogens, OH, $N(R_6)_3$, wherein $R_6$ is selected from the group consisting of H, alkyls having from 1 to 3 carbon atoms and $(R_7)_2N-(CH_2)_{n10}-N(R_7)_2$, wherein $R_7$ is selected from the group consisting of H, alkyls having from 1 to 3 carbon atoms and $n_{10}$ is either 2 or 3.

15. The process of claim 14 wherein the SPNM complex is defined by the following structural formula:

$$(HO)_3Si(CH_2)_3-N(H)-(CH_2)_2-N(H)(H) \cdot PdCl_2$$

16. The process of claim 14 wherein the SPNM complex is defined by the following structural formula:

$$(CH_3O)_3Si-(CH_2)_3-N(H)-(CH_2)_2-N(H)(H) \cdot PdCl_2$$

17. The process of claim 14 wherein the SPNM complex is defined by the following structural formula:

$$[(HO)_3Si-(CH_2)_3-N(H)-(CH_2)_2-N(H)(H)]_2 Pd^{+2}$$

18. A coated non-conductive substrate which has been produced according to the process of claim 1.

19. A coated non-conductive substrate which has been produced according to the process of claim 2.

20. A metal coated non-conductive substrate which has been produced according to the process of claim 4.

21. A metal coated non-conductive substrate which has been produced according to the process of claim 5.